Jan. 9, 1934. J. C. MARTIN, JR Re. 19,041

PLUG COCK AND LUBRICATING MEANS THEREFOR

Original Filed June 26, 1922

Witness:
Geo. C. Brown

Inventor
Jesse C. Martin Jr
By attorney
Paul Carpenter

Reissued Jan. 9, 1934

Re. 19,041

UNITED STATES PATENT OFFICE 19,041

PLUG COCK AND LUBRICATING MEANS THEREFOR

Jesse C. Martin, Jr., Sausalito, Calif., assignor to Walworth Patents Inc., Boston, Mass., a corporation of Massachusetts Original No. 1,456,326, dated May 22, 1923, Serial No. 570,991, June 26, 1922. Application for reissue May 19, 1925. Serial No. 31,462

11 Claims. (Cl. 251—93)

The invention relates to plug cocks and has as an object the provision of a plug cock which shall be exceedingly simple to manufacture and efficient in operation. A further object of the invention is the provision of a plug cock which is packed by means of a packing acting on the tapered portion of the plug whereby to more readily provide a tight joint and to reduce the over all dimensions of the plug. A further object of the invention is the provision of a lubricating means for a plug cock in which the lubricant is held under pressure. A further object of the invention is the provision of lubricant supplying means for a plug cock wherein pressure may be applied upon the lubricant either by means of a grease gun, or by means of a screw compressor.

An illustrative embodiment of the invention is shown in the accompanying drawing in which Fig. 1 is an elevation;

Figure 1:
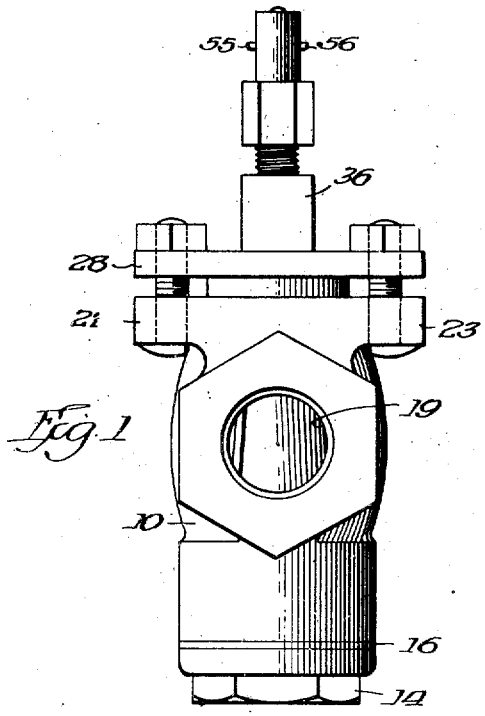

As illustrated in the drawing the invention comprises a plug cock having a body 10 provided with an upwardly tapered plug seat 11. A correspondingly tapered plug 12 is shown seated within said seat and pressed into contact therewith by means of a compression spring 13 acting against a cap 14 as an abutment. The cap 14 is shown as screwing within a recess 15 in the lower portion of the body 10, a gasket 16 being provided to ensure a tight joint.

As shown the plug cock 12 is provided with a central stud 17 acting as a steadying element for the spring 13. The plug 12 is shown as extending sufficiently beyond the ports 18 and 19 at its smaller end to provide a surface for coaction with gland rings 20 of suitable material preferably of a fibrous nature. A recess 21 is formed in the body portion 10 for the reception of the rings. The rings 20, seated in the recess 21, contact with the tapered surface of the plug about its smaller end and beyond the plug seat 11.

Ears 22, 23 are shown formed upon the body 10, which ears are perforated for reception of bolts 24, 25, which bolts pass through openings 26, 27 formed in extended portions of a gland-ring 28. A circular portion 29 of the gland ring 28 is provided of a diameter and radial extent to coact with the recess 21 whereby the rings 20 may be compressed therein by turning down the nuts 30, 31.

With the structure described, the action of the spring 13 pressing the plug up toward its seat will also bring the plug into more intimate contact with the packing rings. This coaction of packing rings with a tapered surface is found to provide a much more effective seal than is provided by the usual packing against a cylindrical surface or against a plain annular surface.

The plug is shown as extending beyond the tapered portion which coacts with the packing rings and as being formed with a recess at 32, which recess terminates in shoulders 33, 34 for coaction with a stop member 35 fastened to the top portion of the gland ring. Above the recess 32, the inner wall of which is formed upon the arc of a circle, the plug cock is formed with a squared portion 36 for coaction with a wrench or other form of lever which may be applied to turn the plug in its seat.

Figure 2:
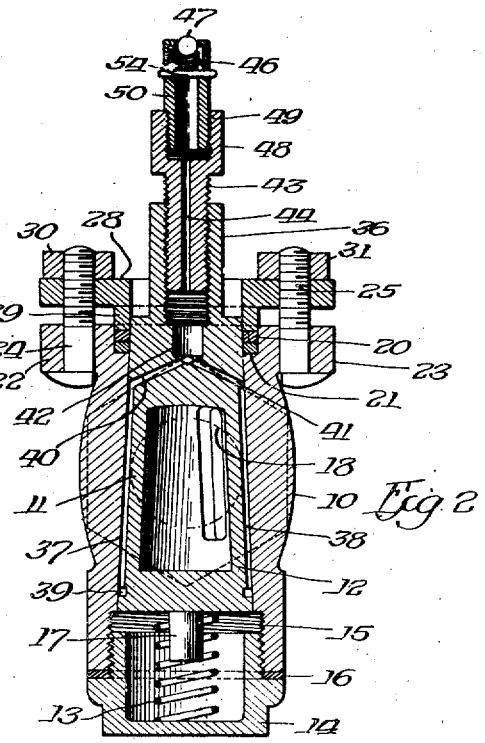
Fig. 2 is a central vertical section in a plane parallel with that of Fig. 1.
Figure 3:
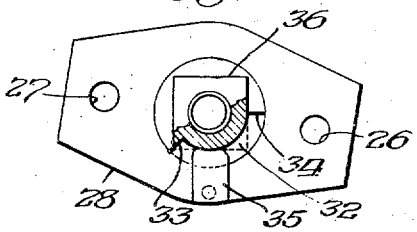
Fig. 3 is a plan view of the gland ring and plug.
Figure 4:
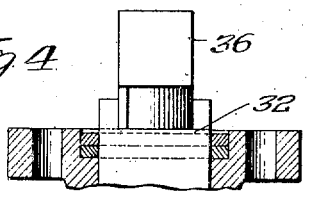
Fig. 4 is a detail view of the gland with the gland ring removed.

For purposes of lubricating the cock, channels 37, 38 are formed longitudinally in the surface of the plug in such a position as to not come opposite either of the ports 18, 19, during the normal turning movement of the plug. The longitudinal channels named connect with an annular channel 39 adjacent the largest portion of the plug and with a pair of upwardly inclined radial passages 40, 41, which communicate with a chamber 42 located centrally of the plug. A considerable extent of the chamber 42 is shown as screw threaded for reception of a screw threaded shank 43 of a lubricating member 48 which itself has a central bore 44 terminating in a valve chamber 45 containing a spring 46 acting in compression to hold a ball valve 47 upon its seat. The member 48 is shown in Fig. 2 as provided with a recess 49 which is internally screw threaded for reception of a nipple 50 having the chamber 45 formed in its upper portion. The spring 46 is shown as seating upon a diametrically placed bar 54 which projects from the wall of the nipple to provide studs 55, 56, for coaction with bayonet slots in the grease gun.

Figure 5:
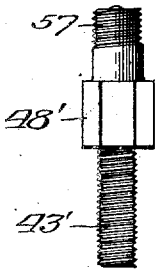
Fig. 5 is a detail elevation of a modified form of lubricant compressor.
Figure 6:
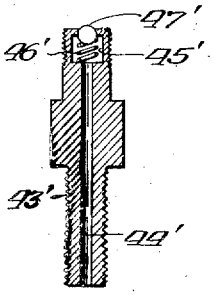
Fig. 6 is a central vertical elevation in a plane parallel with the view of Fig. 5.

A modified form of the member 48 is shown in Figs. 5 and 6 comprising a body 48′ having a screw threaded shank 43′ and a chamber 45′, and spring 46′ acting against a ball 47′. In the modifications of Figs. 5 and 6 the extremity of the lubricating member is shown as screw threaded at 57 for coaction with a screw threaded connector upon a grease gun. Lubricant may be introduced into the chamber 42, the channels 37, 38, 39, by means of a grease gun, under considerable pressure. When the gun is removed the ball 47 will retain the pressure within the enclosures. If desired the chamber in the cap 14 may be filled with grease when the device is assembled.

In the absence of a grease gun the member 48 may be removed and the grease may be packed into the chamber 42, also into the bore 44 of the member 48, which grease will be placed under compression by screwing in of the shank 43 in a well known manner. The form shown in Fig. 2 permits of the removal of the member 43, 48 and the application of the nipple 50 directly to the plug, when a grease gun is available, with reduction of the over all height of the device.

The coaction of the gland rings with the tapered surface of the plug is found to require less pressure to provide a tight joint than the structures heretofore in use of which I am aware, and also requires much less travel of the ring to ensure a tight joint. The fact that less pressure is required together with the provision of the lubricant under pressure to ensure that all portions of the frictional surfaces of the cock shall be lubricated, provides a plug cock which may be operated with a minimum of force and which will never become frozen so as to make its operation impossible, as has been the case in many instances with plug cocks heretofore in use.

Should the plug become corroded to its seat it may be broken loose by compression of the joint packing 20 by turning down on nuts 30, 31. However, a plug embodying the present invention is little likely to stick since the introduction of lubricant under pressure between the surfaces of the plug and seat provides a sealed plug that will not leak even under high pressures, without actual close contact of the metallic surfaces of the plug and seat. The act of introducing the lubricant will overcome the spring 13 sufficiently to allow the lubricant to fill the chamber 15.

A plug of the type in question, when used with high pressures, often is forced so tightly against its seat by the fluid pressure gaining access to the spring chamber, as to be moved only with great difficulty. The present invention obviates this defect since the compression of the packing may be caused to slightly space the plug and seat and the space may be filled with lubricant under pressure to provide easy movement as well as a seal against leakage. When the plug 43 has been entirely screwed home the attendant is made aware that a new supply of lubricant is needed which supply can be introduced without removal of the plug 43 and thus without allowing access of grit to the lubricant passages.

Minor changes may be made in the physical embodiment of the invention without departing from its spirit.

One of the advantages of the structure of the present invention resides in the provision of means whereby the plug may be lifted from its seat, when that is necessary or desirable, recesses 37, 38 being provided in the surface of contact, that is the bearing or seating surface, of the plug and casing. One or more of such recesses may be provided, the area thereof being such that when the lubricant is placed under pressure, as by rotation of the lubricating member 48, and forced through the chamber 42, passages 40, 41, and recesses 37, 38, the force exerted upon the plug may be increased to a point sufficient to raise it from the seat, when the force exerted by the spring 13 is overcome.

Having thus described my invention and illustrated its use, what I claim as new and desire to secure by Letters Patent is:

1. A plug cock comprising, in combination, a casing having a tapered seat, a plug fitting said seat, resilient means pressing said plug toward said seat, joint packing co-acting with the surface of the plug adjacent the small end thereof, means for compressing said packing whereby to relieve the friction between the plug and seat by compression of said resilient means, and means to lubricate the plug and plug seat surfaces.

2. A plug cock comprising, in combination, a casing having a tapered seat, a plug fitting said seat, resilient means pressing said plug toward said seat, joint packing pressed against said plug adjacent the smaller end of the seat, and means for confining lubricant under pressure between said plug and seat surfaces.

3. In a plug cock, a plug seated in a plug seat, joint packing seated against the tapered surface of the small end of the plug, the said packing extending beyond the plug seating surface, means for confining lubricant between the plug and plug seat surfaces comprising a filling inlet, a hollow screw in the filling inlet adapted to compress lubricant, a check valve in the screw, and fluid tight means for the attachment of a lubricant compressor to said screw.

4. A plug cock comprising, in combination, a casing having a tapered seat, a plug fitting said seat, resilient means to press the plug toward the seat, joint packing co-acting with the tapered surface of the plug adjacent its smaller end only, means to compress said packing whereby to act against said resilient means and relieve the plug in the seat and means for lubricating the plug and seat surfaces.

5. A plug cock comprising, in combination, a casing having a tapered seat and a chamber at one end thereof, a plug fitting said seat, resilient means in the chamber to press the plug toward the seat, joint packing pressed against the plug adjacent the smaller end only thereof, means for confining lubricant under pressure within said chamber and between the plug and seat surfaces.

6. A grease plug for lubricating the frictionally engaging surfaces of a plug cock, or the like, comprising a hollow screw adapted to compress lubricant, a check valve in one end of the screw communicating with the opening therethrough and fluid tight means for the attachment of a lubricant compressor to the screw.

7. A lubricator comprising a plug having a central bore and an extended screw threaded shank, means for attachment of a grease gun to said plug, an inwardly opening valve for retention of lubricant within said bore whereby pressure may be applied from a grease gun or by compression caused by screwing in of said shank.

8. A plug cock comprising, in combination, a casing having a tapered seat, a plug fitting said seat, resilient means pressing said plug toward said seat, joint packing co-acting with the surface of the plug adjacent the small end thereof, and means for compressing said packing whereby to relieve the friction between the plug and seat by compression of said resilient means.

9. A valve comprising a casing having a passageway therethrough, a plug seated in the casing and having a hole adapted to register with the passageway through the casing, means for yieldingly holding the plug against its seat, a recess in the surface of contact between the plug and casing, a threaded lubricant reservoir in the plug having communication with the recess, a lubricant screw movable in the reservoir for exerting pressure on the lubricant therein to force it into the recess, and a check valve having a threaded hollow body in axial alignment with the lubricant reservoir for preventing reflux of lubricant therefrom.

10. A valve comprising a casing having a passage-way therethrough, a plug seated in the casing and having a hole adapted to register with the passage-way through the casing, lubricant grooves in the seating surface between the plug and casing, a chamber for lubricant in the plug communicating with the lubricant passages and having a threaded periphery, a threaded plunger having engagement with the walls of said chamber and movable therein to advance lubricant therethrough to said lubricant grooves, and a check valve associated with the chamber to prevent regress of lubricant therefrom, said check valve having a threaded body adapted for engagement with the walls of said chamber.

11. A valve, comprising a casing having a passageway therethrough, a plug seated in the casing and having a hole adapted to register with the passageway through the casing, lubricant grooves in the seating surface between the plug and casing, a chamber for lubricant in said plug communicating with said lubricant grooves, means for forcing lubricant through said chamber including a plunger advanceable into said chamber and removable therefrom to permit insertion of lubricant into said chamber, and check valve means having a body in axial alignment with said chamber for preventing regress of lubricant therefrom.

JESSE C. MARTIN, Jr.